US007954722B2

(12) United States Patent
Sakama (10) Patent No.: US 7,954,722 B2
(45) Date of Patent: Jun. 7, 2011

(54) IC TAG AND INLET FOR IC TAG (75) Inventor: Isao Sakama, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 979 days.

(21) Appl. No.: 11/740,446

(22) Filed: Apr. 26, 2007

(65) Prior Publication Data
US 2008/0035741 A1 Feb. 14, 2008

(30) Foreign Application Priority Data

May 30, 2006 (JP) ................................. 2006-149118

(51) Int. Cl.
*G06K 19/06* (2006.01)
(52) U.S. Cl. ....................................... 235/492; 235/451
(58) Field of Classification Search .................. 235/492, 235/451, 487; 340/572.7
See application file for complete search history.

(56) References Cited

U.S. PATENT DOCUMENTS

| 5,837,992 | A * | 11/1998 | Onozawa ...................... 235/488 |
| 6,720,930 | B2 * | 4/2004 | Johnson et al. ............... 343/742 |
| 7,044,388 | B2 * | 5/2006 | Kamiya et al. ................ 235/492 |
| 7,055,754 | B2 * | 6/2006 | Forster ........................... 235/492 |
| 7,230,580 | B1 * | 6/2007 | Kelkar et al. ................. 343/870 |
| 2003/0112192 | A1 | 6/2003 | King et al. |
| 2003/0141590 | A1 | 7/2003 | Kamiya et al. |
| 2004/0074975 | A1 * | 4/2004 | Gundlach et al. ............. 235/492 |
| 2004/0263319 | A1 | 12/2004 | Huomo |

FOREIGN PATENT DOCUMENTS

| EP | 1548639 | 6/2005 |
| JP | 2004-240899 | 8/2004 |
| WO | 02/29929 | 4/2002 |

OTHER PUBLICATIONS

EP 07251723.8-2210, Sep. 13, 2007 Search Report, 3 pages.

* cited by examiner

*Primary Examiner* — Ahshik Kim
(74) *Attorney, Agent, or Firm* — Mattingly & Malur, PC (57) ABSTRACT

An IC tag mounting at least two IC chips operating in different frequency bands. The IC tag having a first inlet including a first antenna having a relatively long operation wavelength and a first IC chip mounted on the first antenna, and a second inlet including a second antenna having an operation wavelength shorter than the first antenna and disposed crossing at a predetermined angle over a line of the first antenna without positioning both opposite ends of the second antenna upon the first antenna and a second IC chip mounted on the second antenna. The second antenna has a matching circuit for impedance matching between the second antenna and the second IC chip. The matching circuit is a slit formed in the second antenna and positioned upon terminals of the second IC chip. Thus, the second antenna is made compact using the first antenna as an auxiliary antenna.

11 Claims, 9 Drawing Sheets

IC TAG AND INLET FOR IC TAG

CROSS-REFERENCE TO RELATED APPLICATIONS

This application contains subject matter which is related to the subject matter of Ser. No. 11/740,439 filed on Apr. 26, 2007, claiming the priority from Japanese application JP-2006-216091 filed on Aug. 8, 2006, entitled "RFID tag and method for reading the same" by Isao Sakama, and assigned to the same assignee as this application.

INCORPORATION BY REFERENCE

The present application claims priority from Japanese application JP2006-149118 filed on May 30, 2006, the content of which is hereby incorporated by reference into this application.

BACKGROUND OF THE INVENTION

The present invention relates to an integrated circuit (IC) tag (hereinafter representatively called "IC card") mounting an IC chip storing information and a compact antenna, and more particularly to an IC tag mounting two IC chips operating in different frequency bands and two antennas operating in a dual band.

IC tags of a card size mounting an IC chip and a compact antenna, i.e., IC cards, are prevailing recently under the merchandise names such as Suica (registered trademark) and Edy (registered trademark). An IC card mounts a small IC chip having a width of about 0.4 mm, a depth of about 0.4 mm and a height of about 0.1 mm near the center of a transmission antenna having a length of about 52 mm and an operation frequency of 2.45 GHz. As the IC card is held to a reader/writer (read terminal), information recorded in the IC card can be read in a non-contact manner. It is desired that the communication distance of the IC card be as long as possible. Therefore, a loop antenna, a dipole antenna and the like of various shapes have been devised as an antenna to be mounted on the IC card in order to improve the radio field strength and directivity.

Depending upon the circulation circumstances of IC cards, a user is required in some cases to have two or more IC cards, for example, to use IC cards by discriminating between Suica (registered trademark) and Edy (registered trademark). In order to eliminate such inconvenience, techniques on a hybrid-type non-contact IC card having functions of two IC cards have been disclosed (for example, refer to JPA-2004-240899 (paragraph numbers 0012 to 0021 and FIG. 1)). According to the techniques, two antennas and two IC chips operating in different frequency bands are mounted on one IC card to realize the functions of two IC cards by one IC card.

SUMMARY OF THE INVENTION

However, if two antennas of different frequency bands are disposed arbitrarily on the same flat plane of an IC card, frequency interference occurs and the performances of the antennas are degraded, which may result in difficulty in reading information recorded in the IC card. This can be understood easily from the fact that if two IC cards operating in different frequency bands are stacked and held to a reader/writer, frequency interference occurs and the communication performance of at least one of the IC cards is degraded and read errors occur.

Namely, if two IC chips mounted on one IC card operate in different frequency bands, it is necessary to mount two antennas operating in different frequency bands. However, a layout pattern of two antennas operating in different frequency bands is restricted. It has not been elucidated heretofore what layout pattern will not cause mutual interference between two antennas.

The present invention has been made in view of the above-described problem, and an object of the present invention is to provide an IC tag capable of solving the problem of the above-described related art.

Another object of the present invention is to provide an IC tag not susceptible to frequency interference even if two antennas and two IC chips operating in different frequency bands are mounted on one card.

The present invention has been made in order to achieve the above-described objects. According to an aspect of the present invention, there is provided an IC tag mounting at least two IC chips operating in different frequency bands, comprising:

a first inlet including a first antenna having a relatively long operation wavelength and a first IC chip mounted on the first antenna; and a second inlet including a second antenna having an operation wavelength shorter than the first antenna and disposed crossing at a predetermined angle over a line of the first antenna without positioning opposite ends of the second antenna upon the first antenna and a second IC chip mounted on the second antenna.

Other features of the present invention will be described later.

According to the present invention, it is possible to provide an IC tag not susceptible to frequency interference even if two antennas and two IC chips operating in different frequency bands are mounted on one card.

Other objects, features and advantages of the invention will become apparent from the following description of the embodiments of the invention taken in conjunction with the accompanying drawings.

DESCRIPTION OF THE EMBODIMENTS

With reference to the accompanying drawings, description will now be made of an IC card (a representative example of an IC tag) according to the best mode for carrying out the invention (hereinafter called "embodiment"), by using suitable examples. The IC card of the embodiment has an antenna structure such that a second antenna having a relatively short operation wavelength and a shortened antenna length is disposed in a crossed manner on a first antenna of a loop shape having a relatively long operation wavelength.

For example, a second antenna at 2.45 GHz is disposed in a crossed manner on a first antenna at 13.56 MHz as a loop antenna. Namely, the second antenna is disposed in a crossed manner on the first antenna, without positioning opposite ends of the second antenna upon the lines of the first antenna. The optimum layout is to dispose the second antenna crossing at a right angle to (hereinafter also written as "perpendicular to") the first antenna.

If the second antenna is a dipole antenna, the second antenna is generally required to have a length of $\lambda/2$ where $\lambda$ is an operation wavelength. However, in this embodiment, the length of the second antenna is set to $0.2\lambda$ or shorter. Namely, since the first antenna operates as an auxiliary antenna of the second antenna, it is possible to shorten the second antenna to $0.2\lambda$ or shorter. A slit is formed in the second antenna for realizing impedance matching with an IC chip mounted on the second antenna. A discrete IC chip is mounted on the first and second IC chips to interconnect each antenna and each IC chip.

Figure 12A:
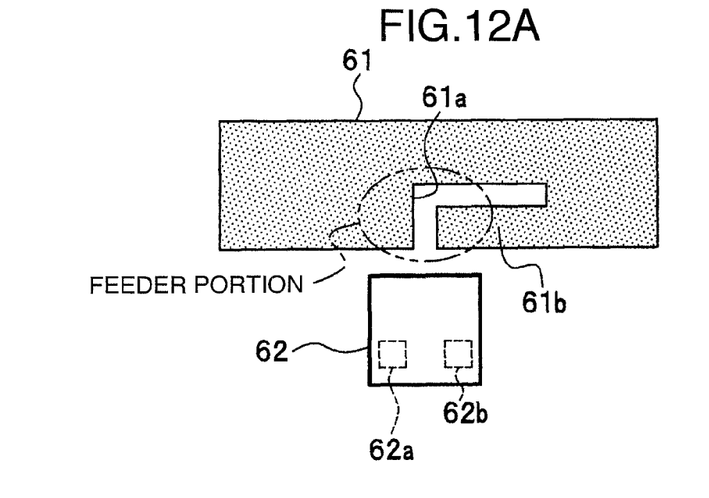
FIG. 12A is a broken view of a second antenna and a second IC chip.

With reference to FIGS. 12A to 12D, the second antenna will be described. FIG. 12A is a broken view of a second antenna and a second IC chip. As shown in FIG. 12A, a slit 61a in a hook shape and a stub 61b are formed at a feeder portion in the central area of the second antenna 61 for realizing impedance matching between the second IC chip 62 and second antenna 61.

Figure 12B:
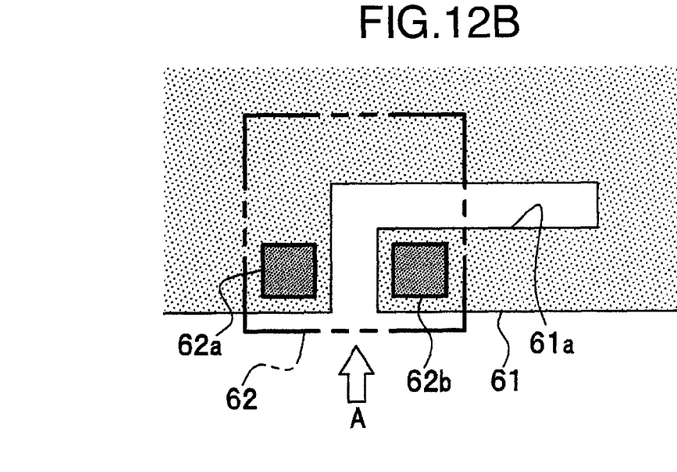
FIG. 12B is a diagram showing the second IC chip mounted on the second antenna.

As shown in FIG. 12B, signal input/output electrodes 62a and 62b of the second IC chip 62 are connected to the second antenna 61, striding over the slit 61a, and the width of the slit 61a is narrower than the distance between terminals (electrodes) of the IC chip 62. In the second antenna 61 and second IC chip 62, the stub 61b formed by forming the slit 61a is serially connected between the antenna 61 and IC chip 62. This stub 61b functions as serially connected inductive components. The inductive components cancel out capacitive components in the second IC chip 62 so that impedance matching can be realized between the second antenna 61 and second IC chip 62.

Figure 12C:
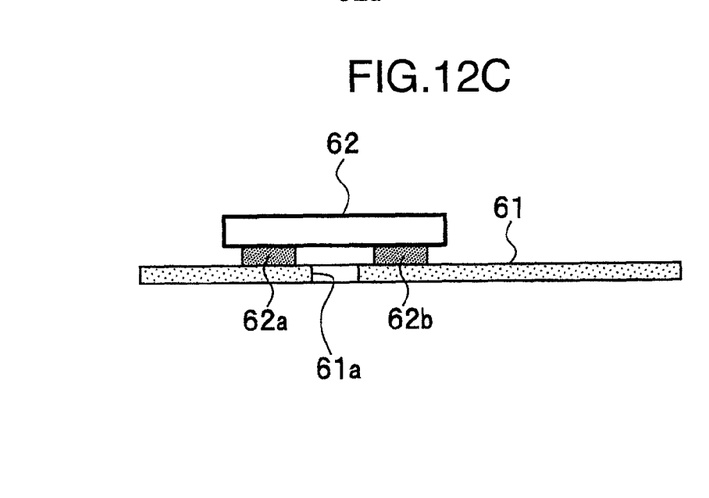
FIG. 12C is a cross sectional view showing bonding portions between the second antenna and second IC chip.

FIG. 12C is a cross sectional view of the second antenna and second IC chip as viewed along an arrow A direction. The signal input/output electrodes 62a and 62b of the second IC chip 62 are gold bumps which bond the second IC chip 62 and second antenna 61 by ultrasonic bonding, metal eutectic bonding or the like.

Figure 12D:
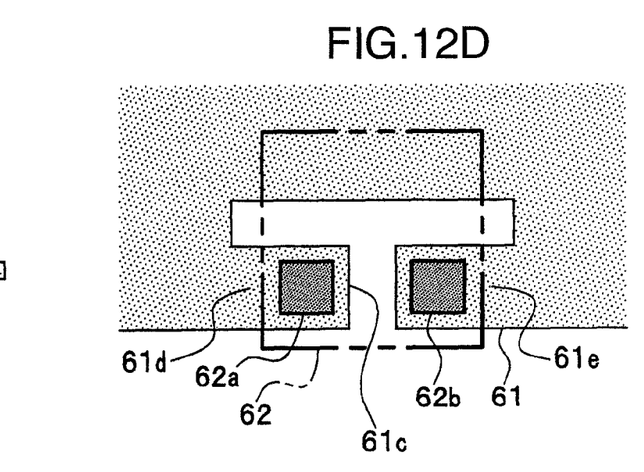
FIG. 12D is a diagram showing a modification of the second antenna whose feeder portion is made of a T-character shaped slit.

As shown in FIG. 12D, similar advantages may be obtained by forming a slit of a T-character shape in the antenna and serially connecting stubs 61d and 61e to the second IC chip 62.

Namely, the second IC chip 62 of this embodiment is a passive type wireless IC chip. The second antenna 61 receives radio waves from a wireless IC chip reader (not shown) and supplies a potential difference generated along an elongated direction to the second IC chip 62 via the feeder portion. This potential difference operates the second IC chip 62.

The first antenna in the longer wavelength 13.56 MHz band is disposed in a crossed manner on the second antenna in the shorter wavelength 2.45 MHz band via an insulator. The material of the insulator is resin, resin foam, paper or the like. Alternatively, the insulator may be pressure sensitive adhesive or adhesive for bonding a first inlet constituting the first antenna and first IC chip and a second inlet constituting the second antenna and second IC chip, or a lamination structure of each material of the insulator, and pressure sensitive adhesive or adhesive.

Alternatively, the first inlet may be laminated with outer package material of the card such as polyethylene terephthalate (PET), glycol denatured copolymer PET resin (PET-G), and polyvinyl chloride (PVC), and the second inlet is bonded to the top or bottom surface of the outer package material. Namely, the outer package material of the card may be used as the insulator. In any case, the thickness of the insulator is set to 0.01 mm or thicker.

First Embodiment

With reference to the accompanying drawings, detailed description will now be made of an IC card according to the first embodiment. First, in order to make it easy to understand, description will be made of the communication characteristics when two IC cards operating at different operation frequencies are stacked.

Figure 13A:
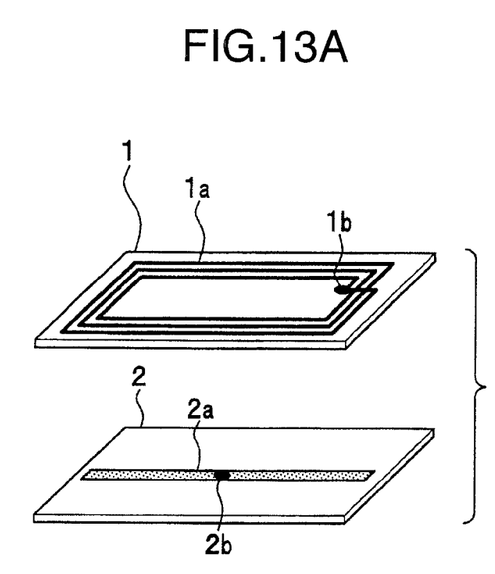
FIGS. 13A to 13C are schematic diagrams in which two IC cards operating at different operation frequencies are stacked.
Figure 13B:
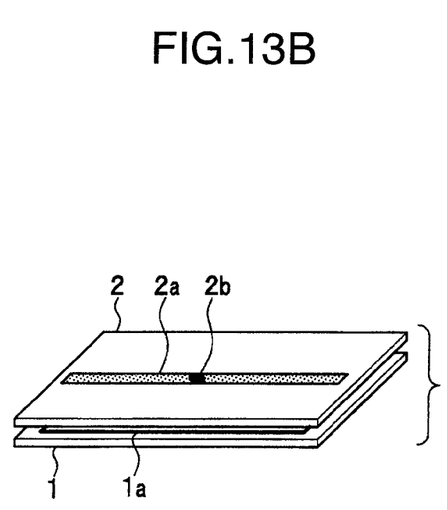
Figure 13C:
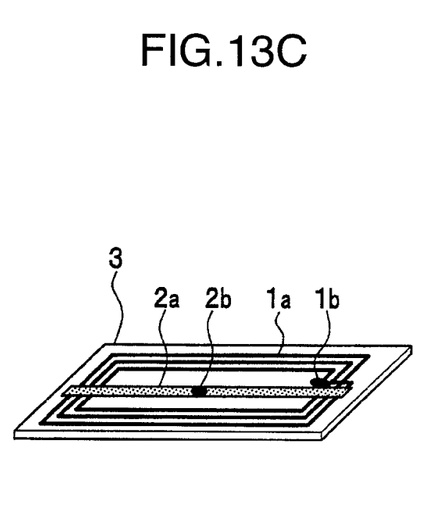

FIGS. 13A to 13C are schematic diagrams showing two stacked IC cards (radio frequency IC cards (RFID cards)) operating at different operation frequencies. As shown in FIG. 13A, a loop antenna 1a having a longer operation wavelength and a first IC chip 1b connected to the loop antenna 1a are mounted in a first IC card 1 having an operation frequency of 13.56 MHz. This loop antenna 1a is disposed in a loop shape near the outer peripheral area of the first IC card 1.

The size of the first IC card is about 54 mm in width and about 84 mm in length. A dipole antenna 2a having a shorter operation wavelength and a second IC chip 2b mounted in a central area of the dipole antenna 2a are mounted in a second IC card 2 having an operation frequency of 2.45 MHz. The dipole antenna 2a has a length of $\lambda/2$ where $\lambda$ is an operation wavelength. For example, if the operation frequency is 2.45 GHz, a length of the dipole antenna 2a is about 52 mm. The size of the second IC card is also about 54 mm in width and about 84 mm in length.

Next, as shown in FIG. 13B, as two IC cards having different operation frequencies, i.e., the first IC card 1 having the operation frequency of 13.56 MHz and the second IC card 2 having the operation frequency of 2.45 GHz, are stacked, radio waves interfere along a line parallel to the loop antenna 1a of the first IC card 1 and the dipole antenna 2a of the second IC card 2, and the communication performance of both the IC cards is degraded.

As shown in FIG. 13C, if two inlets of two RFID tags having different operation frequencies (i.e., a first inlet constituted of the loop antenna 1a and first IC chip 1b and a second inlet constituted of the dipole antenna 2a and second IC chip 2b) are mounted in one IC card 3, the communication performance may be degraded and communications may not be established. The reason why the communication performance is degraded is ascribed to mutual interference between a wavelength of radio waves generated on the elongated line of the loop antenna 1a and a wavelength of radio waves generated on the elongated line of the dipole antenna 2a, and to resultant weakened radio waves.

In this specification, the term "parallel" is intended to include "approximately parallel with an angle shift of several degrees".

Figure 1:
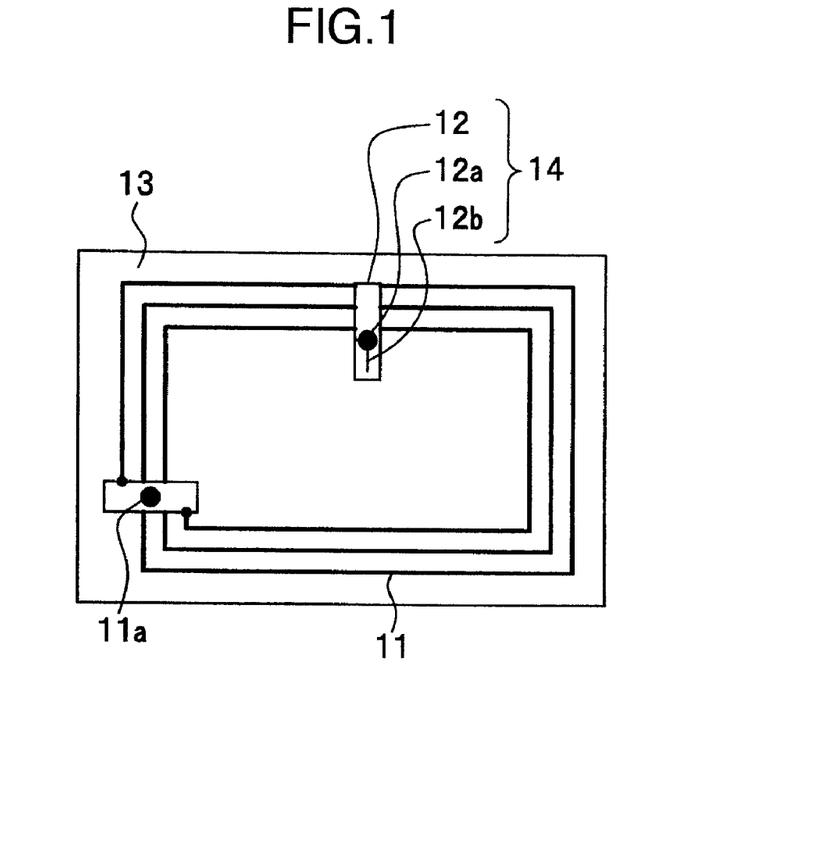
FIG. 1 is a plan view showing the structure of an IC card according to a first embodiment.

In the first embodiment, an optimum IC card applied to the present invention will be described. FIG. 1 is a plan view showing the structure of an IC card according to the first embodiment.

As shown in FIG. 1, an IC card 13 using PET, PET-G or PVC as its outer package material has the structure that a second antenna 12 (corresponding to the second antenna 61 in FIGS. 12A to 12D) having a frequency band of 2.45 GHz is disposed crossing at a right angle (perpendicular to) a portion of a first antenna 11 (hereinafter simply called "a first antenna 11") as a loop antenna having a frequency band of 2.45 GHz. Namely, the second antenna 12 having a shorter wavelength is disposed perpendicular to the first antenna 11 having a longer wavelength.

More specifically, as described earlier, it is sufficient to dispose the second antenna 12 crossing the first antenna 11 without positioning opposite ends of the second antenna 12 upon the first antenna 11. The optimum layout is, as shown in FIG. 1, to dispose at a right angle the second antenna 12 on the first loop antenna 11.

A first IC chip 11a is mounted on the first antenna 11, and a second IC chip 12a (corresponding to the second IC chip 62 shown in FIGS. 12A to 12D) is mounted on the second antenna 12. The second antenna 12 having an operation frequency of 2.45 GHz is generally required to have a length of $\lambda/2$, i.e., about 52 mm. However, in the layout of the embodiment, the first antenna 11 operates as an auxiliary antenna and the effective antenna length of the second antenna 12 elongates. Therefore, a small antenna having a length of $0.2\lambda$, i.e., about 20 mm, can be used as the second antenna 12. The second antenna can be made compact to a minimum size allowing a slit forming portion as an impedance matching circuit and the IC chip to be mounted. Specifically, the second antenna length can be shortened to 4 mm, i.e., about $0.03\lambda$.

A slit as a matching circuit 12b is formed in the region where the second IC chip 12a is mounted on the second antenna 12, in order to realize impedance matching between the second antenna 12 and second IC chip 12a. In the following, the structure combining the first antenna 11 and first IC chip 11a is called a first inlet, and the structure combining the second antenna 12, second IC chip 12a and matching circuit 12b is called a compact inlet (second inlet) 14.

Description will be made of the manufacture processes for the IC card 13 of the first embodiment shown in FIG. 1. The first antenna 11 mounting the first IC chip 11 is patterned in a loop shape near the outer peripheral area of the IC card 13 to form the first inlet, and the first inlet is laminated with outer package material such as PET, PET-G and PVC to constitute the card. The compact inlet (second inlet) 14 constituted of the second antenna 12, second IC chip 12a and matching circuit 12b is bonded to the top or bottom surface of the card, being perpendicular to the first loop antenna 11.

Namely, the compact inlet (second inlet) 14, which is constituted of the second antenna 12 at the operation frequency of 2.45 GHz shortened to $0.2\lambda$ although the dipole antenna is essentially required to have a length of $\lambda/2$ and the second IC chip 12a mounted upon the matching circuit 12b formed in the second antenna 12, is disposed at a right angle on the first antenna 11 at the operation frequency of 13.56 MHz patterned in advance on the IC card 13 in a loop shape. The second antenna 12 is formed with the matching circuit 12b for realizing impedance matching between the second antenna 12 and second IC chip 12a. This matching circuit can be formed by forming a slit of an L-character shape or T-character shape near the center of an antenna element of the second antenna and mounting the second IC chip striding over the slit.

The compact inlet 14 and first loop antenna 11 are fixed at a right angle via an insulator. This insulator may be acrylic pressure sensitive adhesive or adhesive for bonding the compact inlet 14 and the first inlet (i.e., outer package of the IC card 13) constituting the first antenna 11, or a base member of resin attached with pressure sensitive adhesive or coated with adhesive.

The base member of resin may be made of card outer package material such as PET, polypropylene (PP), PVC and paper. Alternatively, a plastic card constituting the IC card 13 may be used as the insulator. In this case, the compact inlet 14 is disposed on the top or bottom surface of the plastic card constituting the IC card 13, crossing at a right angle the first loop antenna 11, and bonded and fixed to the surface with pressure sensitive adhesive, adhesive or seal.

As the first antenna 11 and second antenna 12 are disposed crossing at a right angle in this manner, the radio waves of the first antenna 11 and radio waves of the second antenna 12 are not subjected to mutual interference. The first and second antennas 11 and 12 can therefore irradiate radio waves efficiently at their operation frequencies. Further, since the first and second antennas 11 and 12 are connected through electrostatic coupling, the effective length of the shortened second antenna 12 is elongated so that more efficient operations are ensured.

Figure 2:
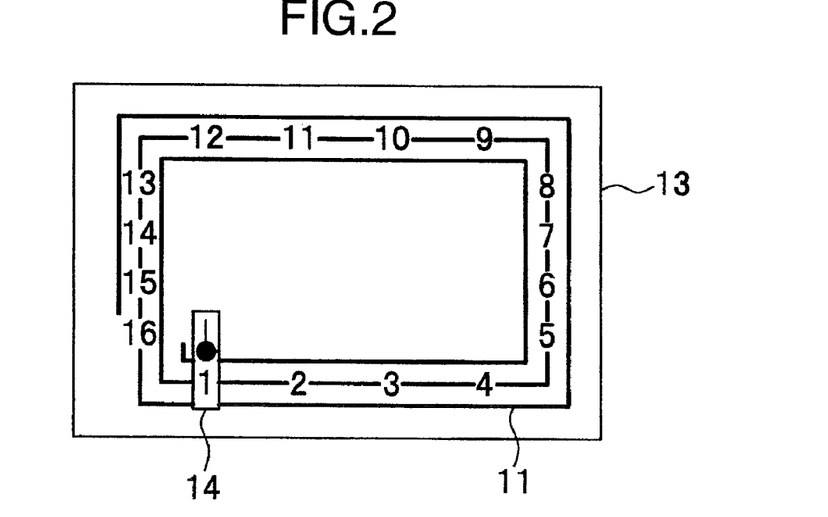
FIG. 2 is a schematic diagram showing a layout position of a second antenna relative to a first antenna in an IC card.
Figure 3:
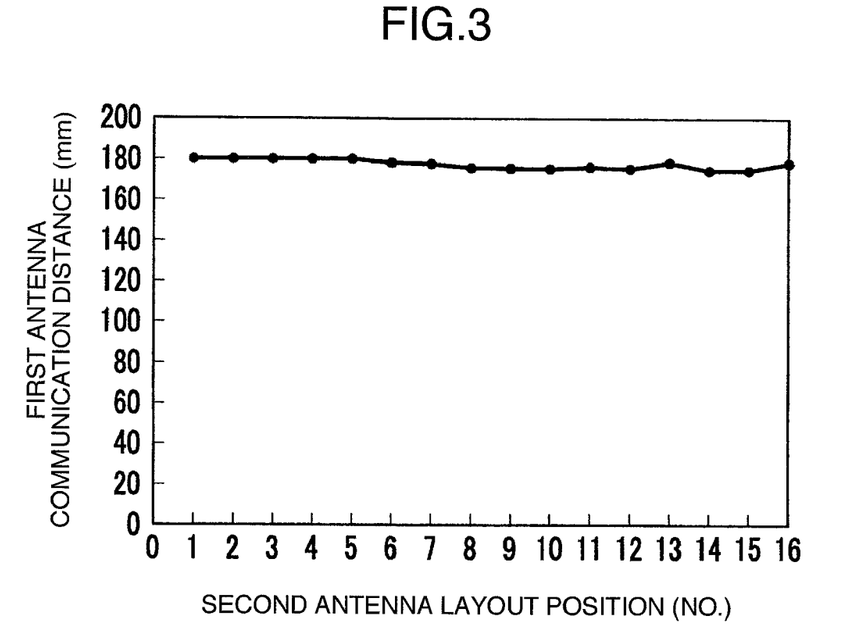
FIG. 3 is a graph showing the characteristics between a communication distance of the first antenna and the layout position of the second antenna in the IC card shown in FIG. 2.
Figure 4:
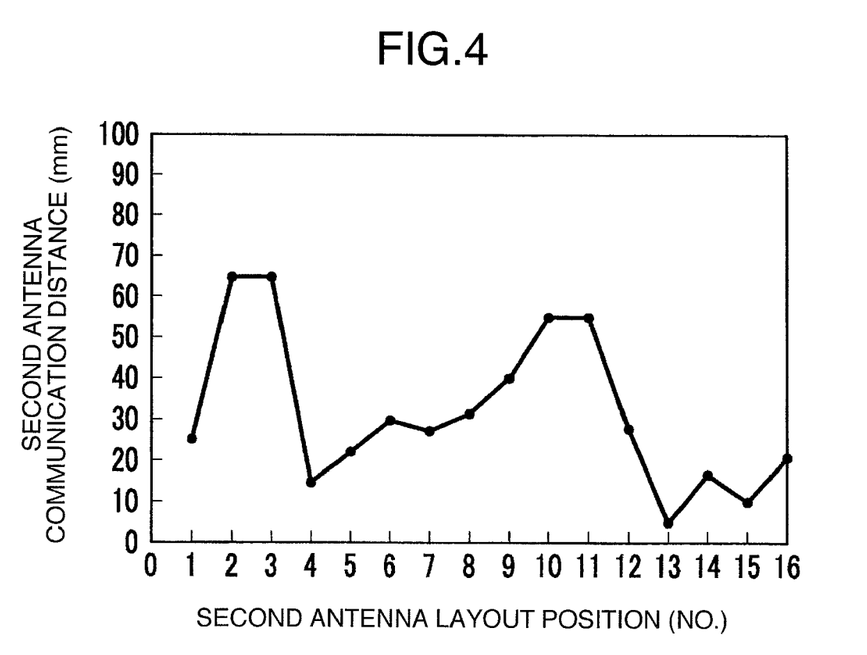
FIG. 4 is a graph showing the characteristics between a communication distance of the second antenna and the layout position of the second antenna in the IC card shown in FIG. 2.

Next, description will be made of an optimum position of the second antenna 12 (compact inlet 14) when the second antenna 12 (compact inlet 14) having a shorter operation wavelength is disposed crossing at a right angle the first loop antenna 11 having a longer operation wavelength. FIG. 2 is a schematic diagram showing the layout position of the second antenna on the first antenna 11 of an IC card. FIG. 3 is a graph showing the characteristics between the communication distance of the first antenna and the layout position of the second antenna in the IC card shown in FIG. 2; the abscissa represents the layout position (No.) of the second antenna, and the ordinate represents the communication distance of the first antenna. FIG. 4 is a graph showing the characteristics between the communication distance of the second antenna and the layout position of the second antenna in the IC card shown in FIG. 2, the abscissa represents the layout position (No.) of the second antenna, and the ordinate represents the communication distance of the second antenna.

Namely, in order to investigate the relation between the communication distance and the layout position of the second antenna 12, the second antenna 12 was disposed at a right angle on the first loop antenna 11 at positions indicated by numerical numbers shown in FIG. 2. In other words, FIG. 2 shows the positions where the second antenna 12 at 2.45 GHz is disposed perpendicular to the first loop antenna 11 at an operation wavelength of 13.56 MHZ sequentially in the counter-clockwise direction starting from the lower left corner. Numerical numbers 1 to 16 shown in FIG. 2 indicate the positions where the second antenna 12 is sequentially disposed on the first antenna 11.

As seen from the graph showing the characteristics between the layout position of the second antenna 12 and the communication distance of the first antenna 11 shown in FIG. 3, the communication distance of the IC chip mounted on the first antenna is stable at about 180 mm even if the second antenna 12 is positioned at any one of the positions at the numerical numbers 1 to 16 on the first antenna 11. Therefore, even if the second antenna 12 at a shorter wavelength is disposed at any arbitrary position, the IC chip mounted on the first antenna 11 having a longer wavelength can stably maintain the communication distance. Namely, the communication distance of the first antenna 11 having a longer wavelength and an operation frequency of 13.56 MHz remains stable without depending upon the layout position of the second antenna having a shorter wavelength and the operation frequency of 2.45 GHz. In other words, the communication characteristics of the first antenna 11 are not influenced even if the second antenna 12 is disposed at any arbitrary position.

However, as seen from the graph showing the characteristics between the layout position of the second antenna 12 and the communication distance of the second antenna 12 shown in FIG. 4, the communication distance of the IC chip mounted on the second antenna 12 is very irregular in the range of 5 to 65 mm at each measurement point where the second antenna 12 is disposed. Namely, although the communication distance of the second antenna 12 is good in the range of 55 to 65 mm at the layout positions of No. 2, No. 3, No. 10 and No. 11 of the second antenna 12, the communication distance of the second antenna 12 is short at the other layout positions of the second antenna 12. Namely, the communication distance of the second antenna 12 having a shorter wavelength and an operation frequency of 2.45 GHz changes greatly with the layout position of the first antenna 11 having a longer wavelength and an operation frequency of 13.56 MHz.

It can be seen from these measurements that the second antenna 12 presents good communication characteristics at positions near the center of the longer side (i.e., upper and lower lateral sides in FIG. 4) of the first loop antenna 11. In other words, it can be understood that the second antenna 12 can have good communication characteristics if the second antenna 12 is disposed at a right angle on the first antenna 11 at the positions far from the position where the second antenna becomes parallel to the line of the first antenna 11. The reason for this can be understood readily from the fact that mutual interference of radio waves generated on the line of the first antenna 11 and radio waves generated on the longitudinal line of the second antenna 12 is weakened as a parallelism distance between the line of the first antenna 11 and the longitudinal line of the second antenna 12 is set remoter.

The layout of these antennas will be described with reference to FIG. 1. It is preferable that the compact inlet 14 is disposed at the position near the center of the upper side of the first antenna 11, or although not shown, at the position near the center of the lower side of the first antenna 11. Although communication characteristics are degraded somewhat, the compact inlet 14 may be disposed at the position near the center of the right or left side of the first antenna 11.

Second Embodiment

In the second embodiment, description will be made of some variations of the layout such that the second antenna 12 (i.e., compact inlet 14) is disposed at a right angle on the first antenna having a longer wavelength. FIGS. 5A to 5D are diagrams showing some variations of the layout such that the compact inlet is disposed at a right angle on the first antenna in an IC card of the second embodiment. Namely, FIGS. 5A to 5D are partially enlarged views of the layout of the first antenna 11 and compact inlet 14 in the IC card 13 such as shown in FIG. 1.

Figure 5A:
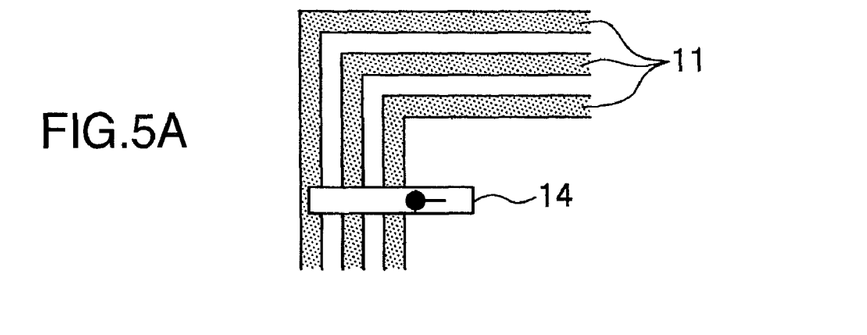
FIGS. 5A to 5D are diagrams showing variations of the layout having a compact inlet disposed perpendicular to a first antenna in an IC card according to a second embodiment.

As shown in FIG. 5A, a compact inlet 14 is disposed perpendicular to a plurality of lines of the left shorter side of a first antenna 11 formed in a loop shape. In this case, about a half of the compact inlet 14 is disposed upon a plurality of lines of the first antenna 11, without positioning opposite ends of the compact inlet 14 upon the lines of the first antenna 11. Obviously, the compact inlet 14 may be disposed perpendicular to a plurality of lines of the right shorter side of the first loop antenna 11. In the layout shown in FIG. 5A, if the layout position of the compact inlet 14 is near the corner of the loop, the parallelism distance between the compact inlet 14 and the inner line of the upper side of the first antenna 11 becomes short so that radio waves of the second antenna of the compact inlet 14 are weakened due to mutual interference. Therefore, the layout position of the compact inlet 14 is preferably spaced apart from the corner of the loop as much as possible.

Figure 5B:
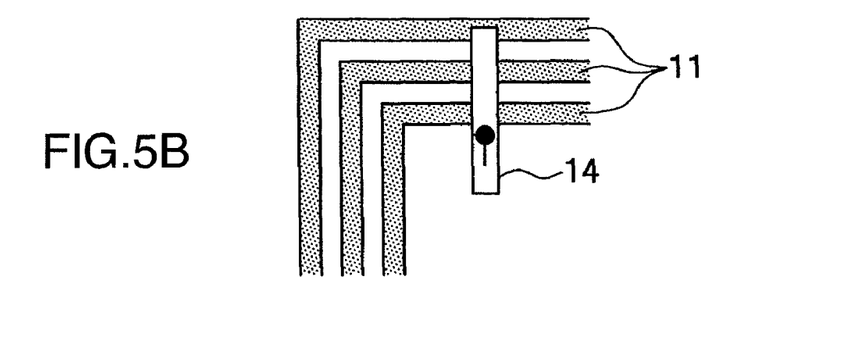

As shown in FIG. 5B, the compact inlet 14 is disposed perpendicular to a plurality of lines of the upper shorter side of the first antenna 11 formed in a loop shape. In this case, about a half of the compact inlet 14 is disposed upon a plurality of lines of the first antenna 11, without positioning opposite ends of the compact inlet 14 upon the lines of the first antenna 11. Obviously, the compact inlet 14 may be disposed perpendicular to a plurality of lines of the lower side of the first loop antenna 11. In the layout shown in FIG. 5B, if the layout position of the compact inlet 14 is near the corner of the loop, the parallelism distance between the compact inlet 14 and the inner line of the left side of the first antenna 11 becomes short so that radio waves of the second antenna of the compact inlet 14 are weakened due to mutual interference. Therefore, the layout position of the compact inlet 14 is preferably spaced apart from the loop corner as much as possible.

Figure 5C:
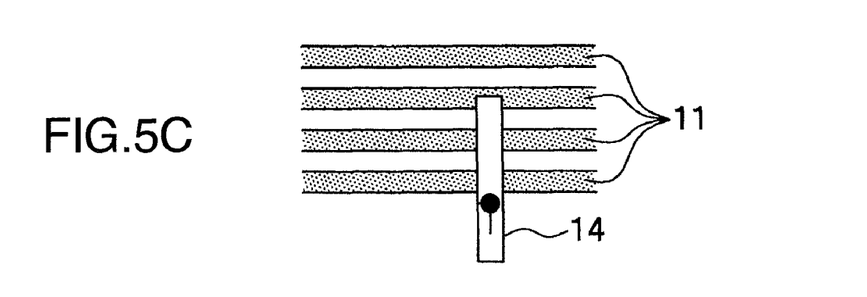

As shown in FIG. 5C, the compact inlet 14 is disposed perpendicular to a plurality of lines near the center of the upper side (longer side) of the first antenna 11 formed in a loop shape. In this case, about a half of the compact inlet 14 is disposed upon a plurality of lines of the first antenna 11, without positioning opposite ends of the compact inlet 14 upon the lines of the first antenna 11. Obviously, the compact inlet 14 may be disposed perpendicular to a plurality of lines near the center of the lower side of the first loop antenna 11. As the compact inlet 14 is disposed perpendicular to a plurality of lines near the center of the upper or lower side of the first loop antenna 11, the parallelism distance between the second antenna in the compact inlet 14 and any line of the first antenna 11 becomes long. There is therefore no fear that radio waves of the second antenna in the compact inlet 14 are weakened by mutual interference.

Figure 5D:
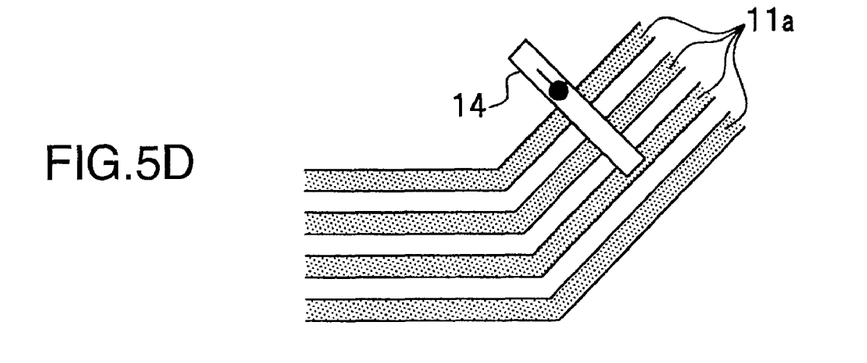

As shown in FIG. 5D, even if the corner of a first antenna 11a formed in a loop shape does not have a right angle, a compact inlet 14 is disposed perpendicular to a plurality of lines of the first antenna 11a. Also in this case, about a half of the compact inlet 14 is disposed upon a plurality of lines of the first antenna 11a, without positioning opposite ends of the compact inlet 14 upon the lines of the first antenna 11a.

Third Embodiment

Figure 6A:
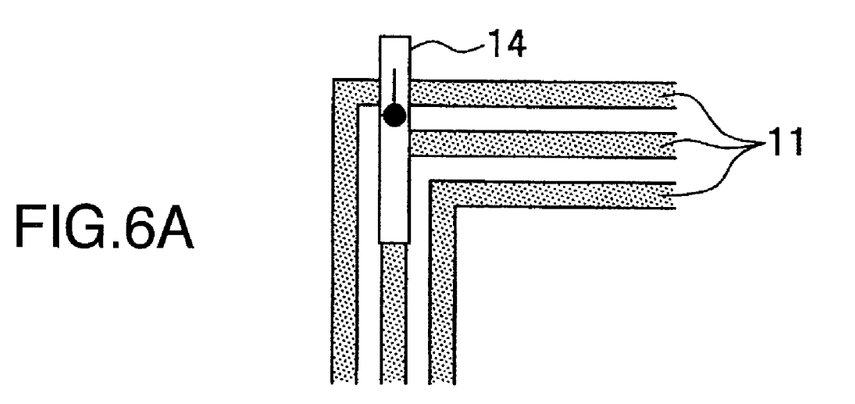
FIGS. 6A and 6B are diagrams showing variations of the layout having a compact inlet whose half is disposed parallel to a first antenna in an IC card according to a third embodiment.
Figure 6B:
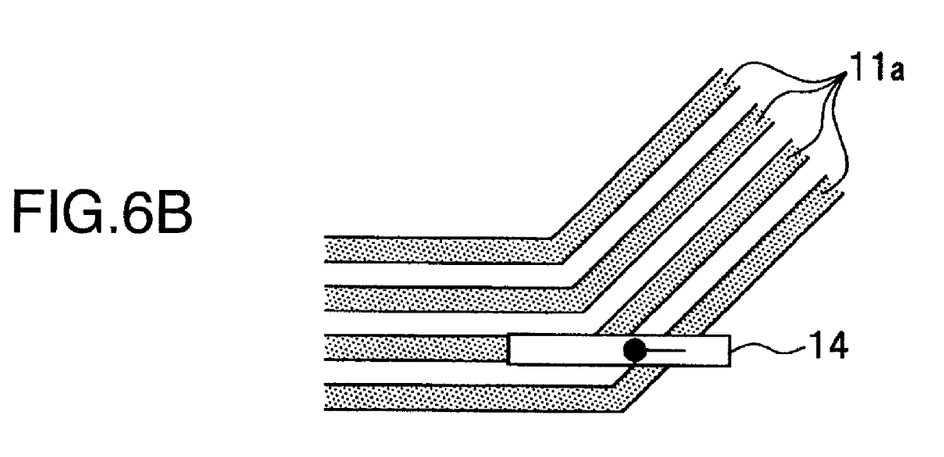

In the third embodiment, description will be made on some variations of the layout such that a half of a compact inlet 14 having a shorter wavelength is disposed in parallel to a first antenna 11 having a longer wavelength. FIGS. 6A and 6B are diagrams showing some variations of the layout such that a half of the compact inlet is disposed in parallel to the first antenna in an IC card of the third embodiment.

Namely, FIGS. 6A and 6B are partially enlarged views of the layout of the first antenna and the compact inlet 14 in the IC card such as shown in FIG. 1.

As shown in FIG. 6A, a half of the compact inlet 14 is disposed in parallel to one line among a plurality of lines at the left shorter side of the first antenna 11 formed in a loop shape, and the remaining half of the compact inlet 14 is disposed perpendicular to at least one line among a plurality of lines on the upper longer side of the first antenna 11. This antenna layout can also make the second antenna of the compact inlet 14 irradiate radio waves efficiently without mutual interference.

As shown in FIG. 6B, even if the corner of a first antenna 11a formed in a loop shape does not have a right angle, a half of the compact inlet 14 is disposed in parallel to one line among a plurality of lines of the first antenna 11a, and the remaining half of the compact inlet 14 is disposed at a predetermined angle relative to at least one line among a plurality of lines of the first antenna 11a. This antenna layout can also make the second antenna of the compact inlet 14 irradiate radio waves efficiently without mutual interference. With the layouts shown in FIGS. 6A and 6B, the degree of mount freedom of the compact inlet 14 can be increased.

Fourth Embodiment

Figure 7:
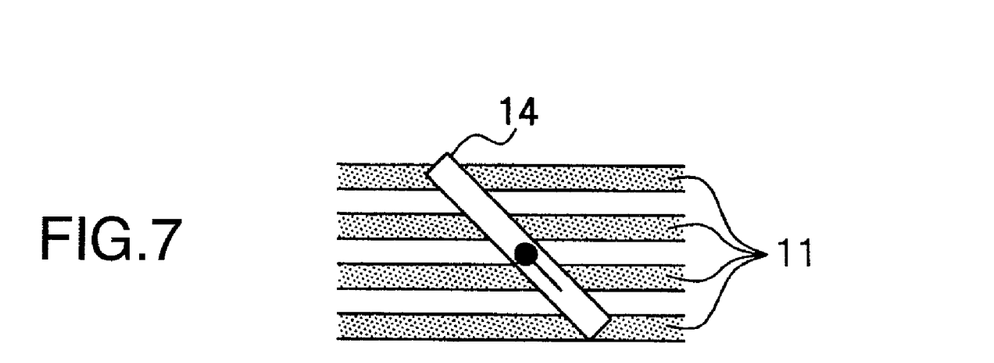
FIG. 7 is a diagram showing a compact inlet disposed at a predetermined inclination angle on a first antenna in an IC card according to a fourth embodiment.

In the fourth embodiment, description will be made of the layout such that a second antenna 12 having a shorter wavelength is disposed at a predetermined angle relative to a first antenna 11 having a longer wavelength. FIG. 7 is a diagram showing the layout such that the compact inlet is disposed at a predetermined angle relative to the first antenna in an IC card of the fourth embodiment. Namely, FIG. 7 is a partially enlarged view of the layout of the first antenna and compact inlet in the IC card such as shown in FIG. 1.

In the fourth embodiment, as shown in FIG. 7, if opposite ends of the compact inlet 14 do not ride upon the same line of the antenna 11 formed in a loop shape, the second antenna of the compact inlet 14 can efficiently irradiate radio waves without mutual interference with the first antenna 11. Namely, if the compact inlet 14 is disposed not in parallel (i.e., at a predetermined angle) relative to the first antenna 11 formed in a loop shape, opposite ends of the compact inlet 14 will not ride upon the same line of the first antenna 11. Therefore, the second antenna of the compact inlet 14 will not be subjected to mutual interference with the first antenna 11.

Fifth Embodiment

In the fifth embodiment, description will be made of using an L-character shaped inlet as the compact inlet constituting the second antenna. FIGS. 8A to 8E are diagrams showing some variations of the antenna layout using an L-character shaped inlet in an IC card of the fifth embodiment.

Figure 8A:
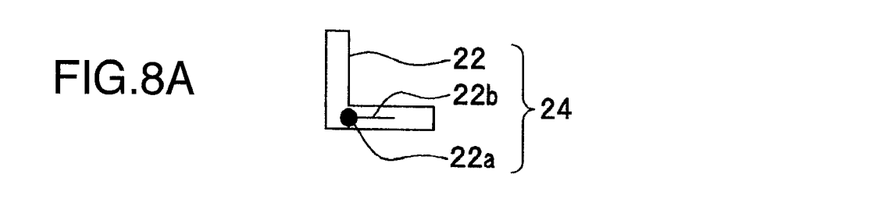
FIGS. 8A to 8E are diagrams showing variations of the antenna layout using an L-character shaped inlet in an IC card according to a fifth embodiment.

As shown in FIG. 8A, an L-character shaped inlet 24 is constituted of an L-character shaped second antenna 22, a second IC chip 22a and a slit 22b realizing a matching circuit.

Figure 8B:
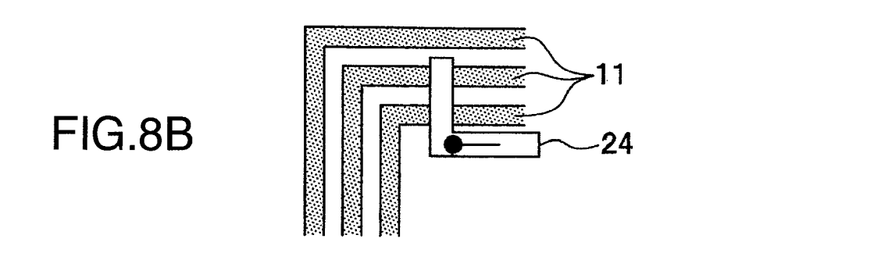

As shown in FIG. 8B, one side of an L-character shaped inlet 24 (hereinafter simply called an "L-character shaped inlet 24") is disposed perpendicular to a plurality of lines of the upper longer side of a first antenna 11 formed in a loop shape. In this case, a half of the L-character shaped inlet 24 is disposed upon a plurality of lines of the first antenna 11, without positioning opposite ends of the L-character shaped inlet 24 upon the lines of the first antenna 11. Obviously, a half of the L-character shaped inlet 24 may be disposed perpendicular to a plurality of lines of the lower side of the first loop antenna 11. In the layout shown in FIG. 8B, if the layout position of the L-character shaped inlet 24 is near the corner of the loop, the parallelism distance between the L-character shaped inlet 24 and the inner line of the left side of the first antenna 11 becomes short so that radio waves of the second antenna of the L-character shaped inlet 24 are weakened by mutual interference. Therefore, the layout position of the L-character shaped inlet 24 is preferably spaced apart from the loop corner as much as possible.

Figure 8C:
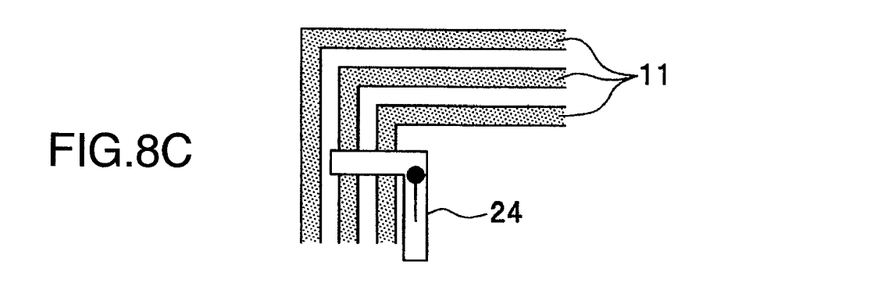

As shown in FIG. 8C, the L-character shaped inlet 24 is disposed perpendicular to a plurality of lines of the left shorter side of the first antenna 11 formed in a loop shape. In this case, a half of the L-character shaped inlet 24 is disposed upon a plurality of lines of the first antenna 11, without positioning opposite ends of the L-character shaped inlet 24 upon the lines of the first antenna 11. Obviously, a half of the L-character shaped inlet 24 may be disposed perpendicular to a plurality of lines of the right side of the first loop antenna 11. In the layout shown in FIG. 8C, if the layout position of the L-character shaped inlet 24 is near the corner of the loop, the parallelism distance between the L-character shaped inlet 24 and the inner line of the upper side of the first antenna 11 becomes short so that radio waves of the second antenna of the L-character shaped inlet 24 are weakened by mutual interference. Therefore, the layout position of the L-character shaped inlet 24 is preferably spaced apart from the loop corner as much as possible.

Figure 8D:
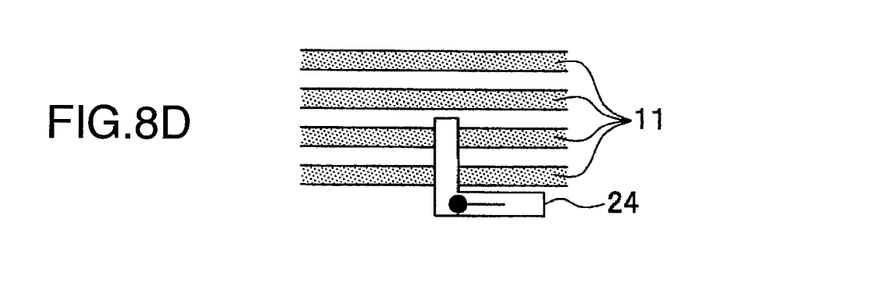

As shown in FIG. 8D, the L-character shaped inlet 24 is disposed perpendicular to a plurality of lines near the center of the upper side (longer side) of the left shorter side of the first antenna 11 formed in a loop shape. In this case, a half of the L-character shaped inlet 24 is disposed upon a plurality of lines of the first antenna 11, without positioning opposite ends of the L-character shaped inlet 24 upon the lines of the first antenna 11. Obviously, the L-character shaped inlet 24 may be disposed perpendicular to a plurality of lines near the center of the lower side of the first loop antenna 11. In this manner, as the L-character shaped inlet 24 is disposed perpendicular to the lines near the center of the upper or lower side of the first antenna 11, the parallelism distance between the second antenna of the L-character shaped inlet 24 and any one of lines of the first antenna 11 becomes long. There is therefore no fear that radio waves of the second antenna of the L-character shaped inlet 24 are weakened by mutual interference.

Figure 8E:
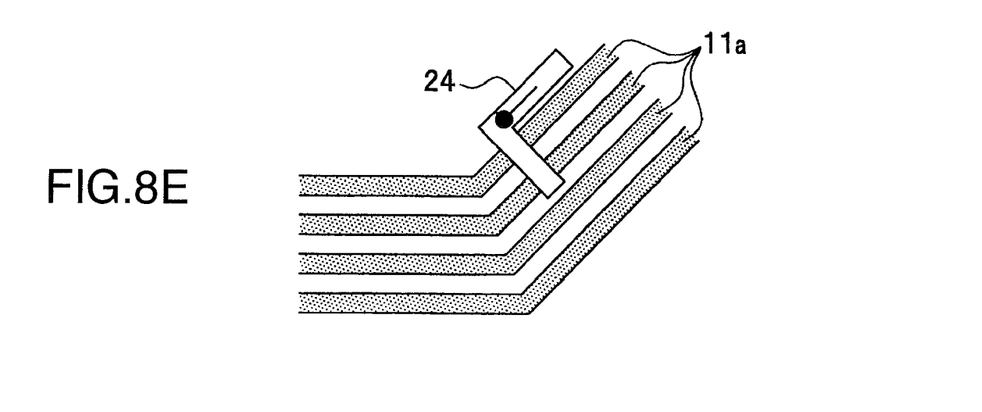

As shown in FIG. 8E, even if the corner of a first antenna 11a formed in a loop shape does not have a right angle, the L-character shaped inlet 24 is disposed perpendicular to a plurality of lines of the first antenna 11a. Also in this case, a half of the L-character shaped inlet 24 is disposed upon a plurality of lines of the first antenna 11a, without positioning opposite ends of the L-character shaped inlet 24 upon the lines of the first antenna 11a.

Namely, by using the L-character shaped inlet 24 as the compact inlet, the second antenna can be disposed in a compact manner. Since the degree of layout freedom of the L-character shaped inlet 24 becomes high relative to the first antenna 11a, the IC card can be made further compact.

Sixth Embodiment

Figure 9A:
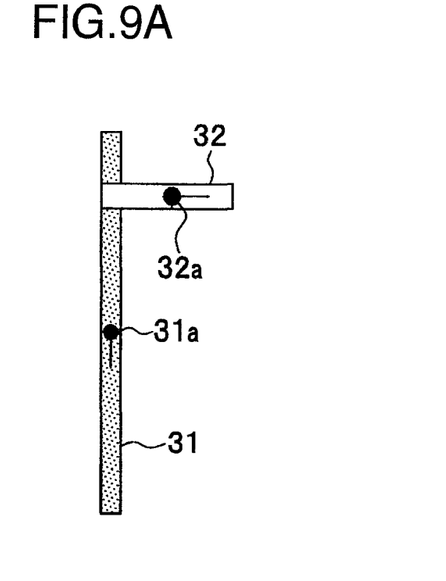
FIGS. 9A and 9B are diagrams showing the antenna layout in which two IC chips operating at the same frequency are disposed in an IC card according to a sixth embodiment.
Figure 9B:
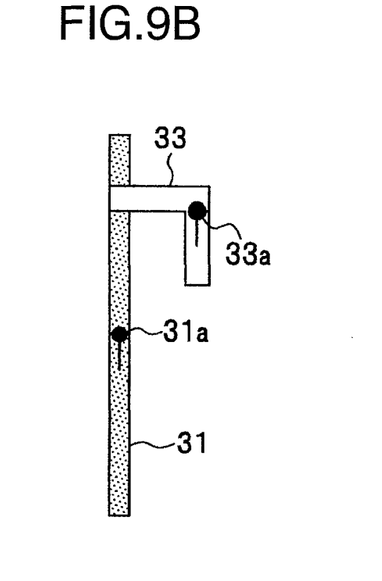

In the sixth embodiment, description will be made of a layout method for antennas when a plurality of IC chips operating at the same frequency are disposed on one IC card. FIGS. 9A and 9B are diagrams showing the antenna layout when two IC chips operating at the same frequency are disposed in a IC card of the sixth embodiment. FIGS. 9A and 9B show only the layout of two antennas and the IC card is omitted.

FIG. 9A shows an example in which a straight type compact inlet is disposed on a first antenna. Namely, as shown in FIG. 9A, a first antenna 31 operating in a 2.45 GHz frequency band is disposed as a dipole antenna having a length of 52 mm. A first IC chip 31a is mounted on the first antenna 31. A portion of a second antenna 32 mounting a second IC chip 32a is disposed perpendicular to the first antenna 31. Since the second antenna 32 uses the first antenna 31 as an auxiliary antenna, the second antenna 32 is a straight type compact antenna having a length of 20 mm or shorter. By disposing two antennas in this way, the IC chip 31a mounted on the first antenna 31 and the second IC chip 32a mounted on the second antenna 32 can operate at the same frequency.

FIG. 9B shows an example in which an L-character shaped inlet is disposed on a first antenna. Namely, as shown in FIG. 9B, a first antenna 31 operating in a 2.45 GHz frequency band is disposed as a dipole antenna having a length of 52 mm. A first IC chip 31a is mounted on the first antenna 31. A portion of a second antenna 33 mounting a second IC chip 33a is disposed perpendicular to the first antenna 31. Since the L-character shaped second antenna 32 uses the first antenna 31 as an auxiliary antenna, the L-character shaped second antenna 32 is a compact antenna having a total length of 20 mm or shorter. By disposing two antennas in this way, the IC chip 31a mounted on the first antenna 31 and the second IC chip 33a mounted on the second antenna 33 can operate at the same frequency.

Seventh Embodiment

Figure 10A:
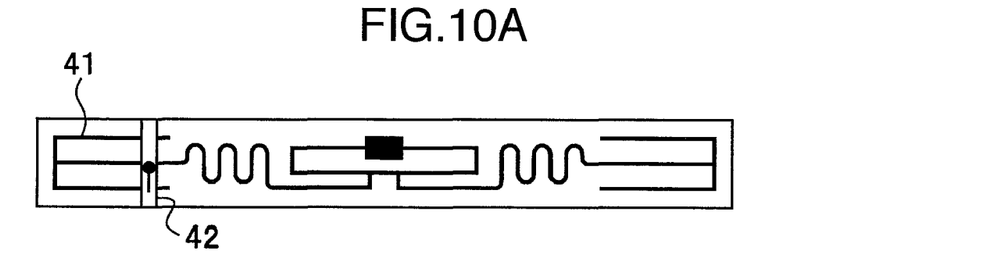
FIG. 10A is a diagram showing the antenna layout of an RFID tag operating in two frequency bands, 900 MHz and 2.45 GHz and having a shortened antenna length at 900 MHz.
Figure 10B:
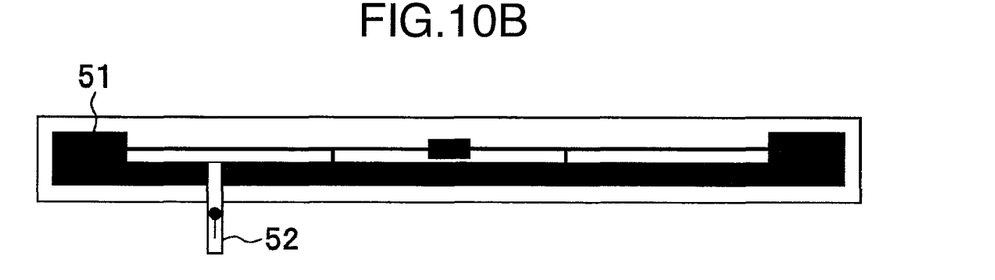
FIG. 10B is a diagram showing the antenna layout of an RFID tag operating in two frequency bands, 900 MHz and 2.45 GHz and having a dipole antenna at 900 MHz.

In the seventh embodiment, description will be made of the antenna layout of an IC card operating in two frequency bands of 900 MHz and 2.45 GHz. FIGS. 10A and 10B are diagrams showing the antenna layout of an RFID tag operating in two frequency bands of 900 MHz and 2.45 GHz. FIG. 10A shows the antenna in the 900 MHz band whose length is shortened by disposing the antenna in a zigzag way. FIG. 10B shows the antenna in the 900 MHz band using a dipole antenna. The RFID tag at 900 MHz is used for a flow management or the like of resources in a factory, and the RFID tag at 2.45 GHz is used for an admission ticket or the like.

As shown in FIG. 10A, a first antenna 41 at 900 MHz is disposed along a zigzag antenna line to shorten the length of the inlet. A second antenna 42 is disposed at a right angle relative to the first antenna 41. The length of the second antenna 42 is 20 mm or shorter.

As shown in FIG. 10B, a first antenna 51 at 900 MHz is constituted of a dipole antenna so that λ/2 is 15 cm, constituting a slightly long inlet. A second antenna 52 is disposed at a right angle relative to the first antenna 51. The length of the second antenna 52 is 20 mm or shorter.

Eighth Embodiment

Figure 11:
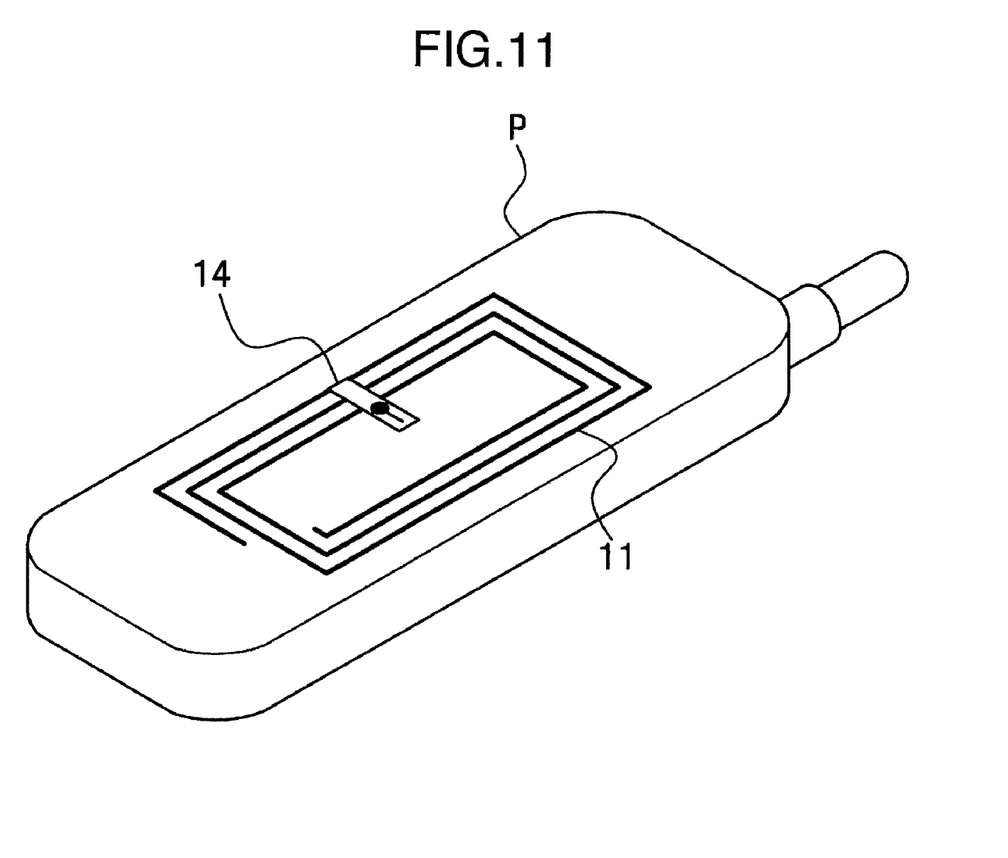
FIG. 11 is a perspective view showing the outline of a mobile phone mounting a first antenna and a compact inlet.

In the eighth embodiment, description will be made of mounting a compact inlet on a mobile phone equipped with a first antenna. FIG. 11 is a perspective view showing the outline of a mobile phone mounting a first antenna and a compact inlet.

As shown in FIG. 11, a first antenna 11 is mounted on a plane of a mobile phone P, and a compact inlet 14 is disposed without positioning opposite ends of the compact inlet upon the lies of the first antenna 11. A cover for covering the plane mounting the first antenna 11 and compact inlet 14, and the like are not shown in FIG. 11.

With this arrangement, a portable phone can be realized which is hard to be subjected to frequency interference even if two antennas and two chips operating in different frequency bands are mounted.

As described so far, if conventional inlets (more specifically, RFID inlets) having antennas in different frequency bands are mounted on one IC card, radio waves interfere and one or both the inlets degrade their communication characteristics. However, if, as in the first embodiment, two inlets in different frequency bands are disposed perpendicularly, the communication characteristics of both the inlets are not degraded so much. Therefore, for example, if an inlet operating at 2.45 GHz is attached to an IC card used at 13.56 MHz, this IC card can be changed easily to an IC card operating in two frequency bands. It is therefore possible to manage two frequency bands by one IC card without using two IC cards. The value-added degree of the IC card can be increased and the IC card can be made further inexpensive.

An RFID tag in a plurality of frequency bands can be easily mounted on a compact mobile apparatus such as a mobile phone by applying the present invention. It is therefore easy to realize a compact mobile apparatus operating in a plurality of frequency bands. Further, even if different frequency bands are used domestically and overseas, an inlet operating in an overseas frequency band is attached to an IC card used domestically so that this IC card can be used both domestically and overseas. Namely, even an RFID tag the details of whose protocol and the like are unknown can be reused easily by attaching an inlet equipped with an antenna in a usable frequency band.

Furthermore, by newly equipping an already existing IC card with an inlet in another frequency band, a new data system can be configured without changing the already existing data system. For example, when Suica (registered trademark) of a railway company A operating at 13.56 MHz is used and if a compact inlet (RFID tag) operating at 2.45 GHz is attached to this card, one card can be used easily for two purposes, Suica (registered trademark) and an employee certificate of the compact inlet.

Namely, the IC card of the embodiment mounts a plurality of IC chips and a plurality of antennas on one IC card. In this case, one IC chip is operated by using an antenna at 13.56 MHz which chip is relatively prevailing for an IC card operation at a radio frequency (RF), and another IC chip is operated by using an antenna at 2.45 GHz which uses the antenna at 13.56 MHz as an auxiliary antenna. Since antennas in two frequency bands can be mounted on one IC card, IC chips of two types can be used without having two cards. Namely, by disposing a second antenna having a shorter wavelength on a first antenna having a longer wavelength in a crossed way, interference between two antennas can be reduced. It is therefore possible to realize an IC card insusceptible to frequency interference even if two antennas and two IC chips operating in different frequency bands are disposed in one IC card.

In the embodiments described above, although the first antenna has a rectangular shape, other shapes may also be used including a triangular shape, a polygonal shape of a pentagonal shape and more, and a circular shape.

The IC tag is not limited to mounting on an IC card, a mobile phone and the like, but the IC tag may be mounted on any other devices so long as they mount a wireless IC and use the first antenna as an auxiliary antenna, such as a label and a package film for merchandise.

It should be further understood by those skilled in the art that although the foregoing description has been made of embodiments of the invention, the invention is not limited thereto and various changes and modifications may be made without departing from the spirit of the invention and the scope of the appended claims.

The invention claimed is:

1. An IC tag mounting at least two IC chips operating in different frequency bands, comprising:
    a first inlet including a first antenna having a relatively long operation wavelength and a first IC chip mounted on said first antenna; and
    a second inlet including a second antenna having an operation wavelength shorter than said first antenna and disposed crossing at a predetermined angle over a line of said first antenna without positioning both opposite ends of said second antenna upon said first antenna and a second IC chip mounted on said second antenna,
    wherein said second antenna has a matching circuit for impedance matching between the second antenna and said second IC chip, and
    wherein said matching circuit is a slit formed in said second antenna and positioned upon terminals of said second IC chip.

2. The IC tag according to claim 1, wherein said predetermined angle is a right angle.

3. The IC tag according to claim 1, wherein said first antenna and said second antenna are inductively coupled via an insulator.

4. The IC tag according to claim 3, wherein said insulator is made of resin, resin foam or paper.

5. The IC tag according to claim 3, wherein said insulator is made of pressure sensitive adhesive or adhesive for bonding said first and second inlets.

6. The IC tag according to claim 3, wherein said insulator is a lamination structure of one of resin, resin foam and paper, and pressure sensitive adhesive or adhesive.

7. The IC tag according to claim 3, wherein a thickness of said insulator is 0.01 mm or thicker.

8. The IC tag according to claim 1, wherein said first inlet is accommodated in outer package material of resin constituting the IC tag, and said second inlet is attached on a top or bottom surface of said outer package material.

9. The IC tag according to claim 8, wherein said outer package material is one of polyethyleneterephthalate (PET), glycol denatured copolymer PET resin (PET-G), and vinyl chloride.

10. An IC tag mounting at least two IC chips operating in different frequency bands, comprising:
    a first inlet including a first antenna having a relatively long operation wavelength and a first IC chip mounted on said first antenna; and
    a second inlet including a second antenna having an operation wavelength shorter than said first antenna and disposed crossing at a predetermined angle over a line of said first antenna without positioning both opposite ends of said second antenna upon said first antenna and a second IC chip mounted on said second antenna,
    wherein a length of said second antenna is $0.2\lambda$ or shorter where $\lambda$ is the operation wavelength of said second antenna.

11. An IC tag mounting at least two IC chips operating in different frequency bands, comprising:
    a first inlet including a first antenna having a relatively long operation wavelength and a first IC chip mounted on said first antenna; and
    a second inlet including a second antenna having an operation wavelength shorter than said first antenna and disposed crossing at a predetermined angle over a line of said first antenna without positioning both opposite ends of said second antenna upon said first antenna and a second IC chip mounted on said second antenna,
    wherein said an operation frequency of said first antenna is 13.56 MHz and an operation frequency of said second antenna is 2.45 GHz.

* * * * *